United States Patent
Blackburn et al.

(10) Patent No.: US 8,885,601 B2
(45) Date of Patent: Nov. 11, 2014

(54) SWITCHING USER DEVICES IN A PACKET-BASED NETWORK

(75) Inventors: Helen Blackburn, London (GB); David Dinka, London (GB); Gisela Gier, London (GB); Mark Philip McLaughlin, Surrey (GB)

(73) Assignee: Skype, Dublin (IE)

( * ) Notice: Subject to any disclaimer, the term of this patent is extended or adjusted under 35 U.S.C. 154(b) by 725 days.

(21) Appl. No.: 12/843,527

(22) Filed: Jul. 26, 2010

(65) Prior Publication Data

US 2011/0243141 A1 Oct. 6, 2011

(30) Foreign Application Priority Data

Mar. 31, 2010 (GB) .................................. 1005462.5

(51) Int. Cl.
| | | |
|---|---|---|
| H04W 4/00 | (2009.01) | |
| H04M 1/725 | (2006.01) | |
| H04N 5/445 | (2011.01) | |
| H04N 21/258 | (2011.01) | |
| H04M 1/253 | (2006.01) | |
| H04N 21/658 | (2011.01) | |
| H04N 21/4788 | (2011.01) | |
| H04M 1/00 | (2006.01) | |
| H04M 7/00 | (2006.01) | |
| H04N 21/4223 | (2011.01) | |
| H04M 3/42 | (2006.01) | |
| H04N 21/422 | (2011.01) | |

(52) U.S. Cl.
CPC .......... *H04N 5/44582* (2013.01); *H04M 7/0063* (2013.01); *H04M 1/7253* (2013.01); *H04N 5/44591* (2013.01); *H04N 21/25891* (2013.01); *H04N 21/4223* (2013.01); *H04M 1/2535* (2013.01); *H04M 3/42263* (2013.01); *H04N 21/6581* (2013.01); *H04N 21/25875* (2013.01); *H04N 21/42222* (2013.01); *H04N 21/4788* (2013.01); *H04M 1/006* (2013.01)
USPC ........................................................ 370/331

(58) Field of Classification Search
CPC .................................................. H04W 36/0011
USPC .................................. 370/316, 331, 389, 400
See application file for complete search history.

(56) References Cited

U.S. PATENT DOCUMENTS

| 6,654,722 B1 | 11/2003 | Aldous et al. |
|---|---|---|
| 6,904,025 B1 | 6/2005 | Madour et al. |

(Continued)

FOREIGN PATENT DOCUMENTS

| CN | 1893691 | 1/2007 |
|---|---|---|
| CN | 101212556 | 7/2008 |

(Continued)

OTHER PUBLICATIONS

"Non-Final Office Action", U.S. Appl. No. 12/843,293, (Jan. 30, 2013), 9 pages.

(Continued)

*Primary Examiner* — Man Phan
*Assistant Examiner* — Kevin Lee
(74) *Attorney, Agent, or Firm* — Sonia Cooper; Jim Ross; Micky Minhas

(57) ABSTRACT

A system comprising: a first user device and at least a second user device for a same user, at least one of the first and second user devices being a household media appliance, and each being installed with a respective instance of a communication client application for conducting voice or video calls over a packet-based network. Each instance is associated with a same user identifier identifying the same user, a first of the instances is associated with a first subidentifier, and a second of the instances is associated with a second subidentifier. The instances are configured so as, during an ongoing call conducted over a first network connection established based on the user identifier and the first sub-identifier, after the call has been answered, to establish a second network connection based on the user identifier and the second sub-identifier and to switch the call to the second network connection.

20 Claims, 5 Drawing Sheets

(56) References Cited

U.S. PATENT DOCUMENTS

| | | |
|---|---|---|
| 7,260,186 B2 | 8/2007 | Zhu et al. |
| 7,301,919 B2 | 11/2007 | Sundquist et al. |
| 7,526,253 B2 | 4/2009 | Fujioka |
| 7,693,133 B2 | 4/2010 | Benco et al. |
| 7,716,283 B2 | 5/2010 | Thukral |
| 7,908,630 B2 | 3/2011 | Crandall et al. |
| 8,369,498 B2 | 2/2013 | Dinka et al. |
| 8,451,315 B2 | 5/2013 | Lee |
| 8,711,200 B2 | 4/2014 | Blackburn et al. |
| 2002/0034166 A1 | 3/2002 | Barany et al. |
| 2003/0058805 A1 | 3/2003 | Meyerson et al. |
| 2003/0177099 A1 | 9/2003 | Gallant et al. |
| 2004/0194146 A1 | 9/2004 | Bates et al. |
| 2005/0021872 A1 | 1/2005 | Poustchi et al. |
| 2005/0034079 A1 | 2/2005 | Gunasekar et al. |
| 2005/0041793 A1 | 2/2005 | Fulton et al. |
| 2005/0122963 A1 | 6/2005 | Jeon et al. |
| 2005/0278778 A1 | 12/2005 | D'Agostino et al. |
| 2006/0045070 A1 | 3/2006 | Fotta et al. |
| 2006/0093998 A1 | 5/2006 | Vertegaal |
| 2006/0221174 A1 | 10/2006 | Yang et al. |
| 2007/0070188 A1 | 3/2007 | Shyu |
| 2007/0091833 A1 | 4/2007 | Bauchot et al. |
| 2007/0115348 A1 | 5/2007 | Eppel et al. |
| 2007/0265091 A1 | 11/2007 | Aguilar, Jr. et al. |
| 2007/0280200 A1 | 12/2007 | Patel |
| 2008/0069069 A1 | 3/2008 | Schessel et al. |
| 2008/0075240 A1 | 3/2008 | Ramanathan et al. |
| 2008/0081698 A1 | 4/2008 | Wormald et al. |
| 2008/0157998 A1 | 7/2008 | Zuo et al. |
| 2008/0182365 A1 | 7/2008 | Wang et al. |
| 2008/0235587 A1 | 9/2008 | Heie et al. |
| 2008/0239995 A1 | 10/2008 | Lee et al. |
| 2009/0017792 A1 | 1/2009 | Matsumoto et al. |
| 2009/0136016 A1 | 5/2009 | Gornoi et al. |
| 2009/0172170 A1 | 7/2009 | Rey |
| 2009/0238170 A1 | 9/2009 | Rajan et al. |
| 2009/0271820 A1 | 10/2009 | Choi et al. |
| 2010/0254670 A1 | 10/2010 | Amsterdam et al. |
| 2011/0021200 A1 | 1/2011 | Yi et al. |
| 2011/0109715 A1 | 5/2011 | Jing et al. |
| 2011/0222466 A1* | 9/2011 | Pance et al. .................. 370/316 |
| 2011/0242266 A1 | 10/2011 | Blackburn et al. |
| 2011/0242270 A1 | 10/2011 | Dinka et al. |
| 2011/0243125 A1 | 10/2011 | Kaal et al. |
| 2011/0243140 A1 | 10/2011 | Musku et al. |
| 2011/0243141 A1 | 10/2011 | Blackburn et al. |
| 2011/0244955 A1 | 10/2011 | Dinka et al. |
| 2012/0169831 A1 | 7/2012 | Nietfeld et al. |
| 2013/0169736 A1 | 7/2013 | Lindblom |

FOREIGN PATENT DOCUMENTS

| | | | |
|---|---|---|---|
| EP | 1 475 939 A1 | 11/2004 | |
| EP | 1592198 | 11/2005 | |
| EP | 1 816 843 A1 | 8/2007 | |
| EP | 1 909 467 A1 | 4/2008 | |
| EP | 2 056 601 A1 | 8/2008 | |
| EP | 2 063 612 A1 | 5/2009 | |
| EP | 2 114 062 A1 | 11/2009 | |
| GB | 2479180 | 10/2011 | |
| JP | 2005-86765 A | 3/2005 | |
| WO | WO 2004/066604 A1 | 8/2004 | |
| WO | WO 2005/008524 A1 | 1/2005 | |
| WO | WO 2005/009019 A2 | 1/2005 | |
| WO | WO 2006/051492 A2 | 5/2006 | |
| WO | WO 2006/058036 A3 | 6/2006 | |
| WO | WO 2007/137485 A1 | 6/2007 | |
| WO | WO 2007/118250 A2 | 10/2007 | |
| WO | WO-2007126652 | 11/2007 | |
| WO | WO 2008/015369 A1 | 2/2008 | |
| WO | WO 2009/115048 A1 | 9/2009 | |
| WO | WO 2010/026187 A1 | 3/2010 | |
| WO | WO 2010/026188 A1 | 3/2010 | |
| WO | WO 2010/026189 A1 | 3/2010 | |
| WO | WO 2010/026190 A1 | 3/2010 | |
| WO | WO 2010/026191 A1 | 3/2010 | |
| WO | WO 2010/026194 A1 | 3/2010 | |
| WO | WO 2010/026196 A1 | 3/2010 | |
| WO | WO-2011120948 | 10/2011 | |
| WO | WO-2011120991 | 10/2011 | |
| WO | WO-2011120992 | 10/2011 | |
| WO | WO-2011121006 | 10/2011 | |

OTHER PUBLICATIONS

"Voice over IP (VOIP) Phone System Provider, Philadelphia Pa", Retrieved from <http://www.expertta.com/philadelphia-pa-voice-over-ip-system-provider> on Dec. 11, 2012, (Jan. 17, 2010), 2 pages.

Mock, et al., "A Voice over IP Solution for Mobile Radio Interoperability", *IEEE 56th Vehicular Technology Conference*, Retrieved from <http://ieeexplore.ieee.org/stamp/stamp.jsp?tp=&arnumber=1040433>,(Sep. 24, 2002), 4 pages.

Oprea, et al., "Securing a Remote Terminal Application with a Mobile Trusted Device", *20th Annual Conference on Computer Security Applications*, Retrieved from <http://www.rsa.com/rsalabs/staff/bios/aoprea/publications/acsac.pdf>,(Dec. 6, 2004), 10 pages.

"Non-Final Office Action", U.S. Appl. No. 12/843,569, (Apr. 4, 2012), 13 pages.

"International Search Report and Written Opinion", Application No. PCT/EP2011/054781, (May 23, 2011), 13 pages.

"International Search Report and Written Opinion", Application No. PCT/EP2011/054864, (May 31, 2011), 13 pages.

"International Search Report and Written Opinion", Application No. PCT/EP2011/054881, (Jul. 25, 2011), 18 pages.

Notification of Transmittal of the International Search Report and the Written Opinion of the International Searching Authority, or the Declaration for Application No. PCT/EP2011/054862, dated Jun. 27, 2011, consisting of 17 pages.

"Final Office Action", U.S. Appl. No. 12/843,543, (Aug. 3, 2012), 8 pages.

"Non-Final Office Action", U.S. Appl. No. 12/843,543, (May 29, 2012), 9 pages.

Intellectual Property Office Search Report, date of Search: Jul. 28, 2011, for Application No. GB1005462.5, consisting of 2 pages.

"Bluetooth Profile", downloaded Jun. 28, 2010 from http://en.wikipedia.org/w/index.php?title=Bluetooth_profile&oldid=330823199, accessed Dec. 10, 2009, 9 pages.

"Femtocell", downloaded Jun. 28, 2010 from http://en.wikipedia.org/w/iindex.php?title=Femtocell&oldid=330068819, accessed Dec. 10, 2009, (Dec. 6, 2009), 8 pages.

"Final Office Action", U.S. Appl. No. 12/843,569, (Oct. 9, 2012),20 pages.

"International Search Report and Written Opinion", PCT Application PCT/EP2011-054879, (Jun. 24, 2011), 13 pages.

"IP-DECT", downloaded Jun. 28, 2010 from http://en.wikipedia.org/w/index.phptitle=IPDECT&oldid=322769463, Dec. 10, 2009, 1 page.

"MagicJack Harnesses Femtocell for VoIP", downloaded Jun. 28, 2010 from http://.pcworld.com/article/186308/magicjack_harnesses_for_voip.html, dated Jan. 8, 2010, accessed Feb. 4, 2010, 7 pages.

"Non-Final Office Action", U.S. Appl. No. 12/290,232, (Jun. 11, 2012), 16 pages.

"Notice of Allowance", U.S. Appl. No. 12/843,543, (Oct. 15, 2012), 6 pages.

"Non-Final Office Action", U.S. Appl. No. 12/843,293, (Sep. 23, 2013), 9 pages.

"Final Office Action", U.S. Appl. No. 12/843,293, (Jun. 11, 2013), 9 pages.

"Non-Final Office Action", U.S. Appl. No. 12/843,569, (Apr. 19, 2013), 23 pages.

"PCT Search Report and Written Opinion", Application No. PCT/US2012/072025, (Mar. 26, 2013), 12 pages.

"Notice of Allowance", U.S. Appl. No. 12/843,569, Dec. 11, 2013, 11 pages.

(56) References Cited

OTHER PUBLICATIONS

"Extended European Search Report", EP Application No. 12199326.5, Apr. 3, 2013, 6 pages.
"Final Office Action", U.S. Appl. No. 12/843,293, Apr. 9, 2014, 10 pages.
"Corrected Notice of Allowance", U.S. Appl. No. 12/843,569, Feb. 21, 2014, 2 pages.
"Foreign Office Action", CN Application No. 201180016951.2, May 22, 2014, 19 pages.
"Foreign Office Action", CN Application No. 201180016975.8, Jun. 27, 2014, 15 pages.
"Non-Final Office Action", U.S. Appl. No. 13/710,041, Jul. 8, 2014, 11 pages.

* cited by examiner

SWITCHING USER DEVICES IN A PACKET-BASED NETWORK

RELATED APPLICATION

This application claims priority under 35 U.S.C. §119 or 365 to Great Britain Application No.1005462.5, filed Mar.31, 2010. The entire teachings of the above application are incorporated herein by reference.

FIELD OF THE INVENTION

The present invention relates to a system of user devices including at least one household media appliance having an embedded processing apparatus for conducting voice or video calls via a packet-based network.

BACKGROUND

Some communication systems allow the user of a terminal, such as a personal computer, to conduct voice or video calls over a packet-based computer network such as the Internet. Such communication systems include voice or video over Internet protocol (VoIP) systems. These systems are beneficial to the user as they are often of significantly lower cost than conventional fixed line or mobile networks. This may particularly be the case for long-distance communication. To use a VoIP system, the user installs and executes client software on their terminal. The client software sets up the VoIP connections as well as providing other functions such as registration and authentication. In addition to voice communication, the client may also set up connections for other communication media such as instant messaging ("IM"), SMS messaging, file transfer and voicemail.

One type of communication system for packet-based communication uses a peer-to-peer ("P2P") topology. To enable access to a peer-to-peer system, a user executes P2P client software supplied by a P2P software provider on their terminal, and registers with the P2P system. When the user registers with the P2P system, the client software is provided with a digital certificate from a server. This may be referred to as a "user identity certificate" (UIC). Once the client software has been provided with the certificate, then calls or other communication connections can subsequently be set up and routed between end-users ("peers") of the P2P system without the further use of a server in the call set-up. Instead, the client looks up the required IP addresses from information distributed amongst the P2P client software on other end-users' terminals within the P2P system. That is, the address look-up list is distributed amongst the peers themselves. Once the IP address of a callee's terminal has thus been determined, the caller's P2P client software then exchanges UIC certificates with the callee's P2P client software. The exchange of these digital certificates between users provides proof of the users' identities and that they are suitably authorised and authenticated in the P2P system. Therefore the presentation of digital certificates provides trust in the identity of the users.

It is therefore a characteristic of peer-to-peer communication that, once registered, the users can set up their own communication routes through the P2P system in at least a partially decentralized manner based on distributed address look-up and/or the exchange of one or more digital certificates, without using a server for those purposes. Further details of an example P2P system are disclosed in WO 2005/008524 and WO 2005/009019.

VoIP or other packet-based communications can also be implemented using non-P2P systems that do use centralized call set-up and/or authorisation, e.g. via server.

A problem with packet-based communications is that their accessibility to users is limited. In particular, such communications are most commonly accessed using a client application installed on personal computer. This has a disadvantage in that its use may be limited, since personal computers are often not located in a place where the user is either familiar of comfortable with making phone calls. For example, a personal computer is often located in a study which for many users is not the most natural or comfortable environment for making personal calls. Whilst packet-based communication systems can also be accessed via certain mobile devices, these generally do not have sufficient processing resources, bandwidth or display screens to offer a full range of features, such as video calling.

It would therefore be desirable to make packet-based communications more accessible to users. One way to do this would be to run a packet-based communication client on a processor embedded in a familiar household media appliance like a television set or set-top box for plugging into a television. Embedded in this context means within the casing of the appliance. The ability to integrate an embedded processor into a television set or set-top box is known, and indeed many modern televisions and boxes already contain a processor for performing at least some of the digital signal processing required to decode and output viewable television signals to the screen.

SUMMARY

Whilst a household appliance may be more convenient for making calls in certain circumstances, e.g. in the comfort of a living room, there is also a problem in that household appliances are typically placed at fixed locations around the house. Even semi portable devices such as laptop PCs may be bound to communicating only in certain areas by the range of wireless routers or access points, e.g. by the range of a home WLAN or of wi-fi hotspots. An alternative is to use a fully mobile terminal such as an internet-enabled mobile phone or laptop with wireless data card for accessing the Internet via a mobile cellular network. However, as mentioned, data rates on such connections may be lower, and/or internet access may be more expensive, and furthermore mobile phones do not typically have sufficient processing or screen resources to allow full functionality such as video calling.

According to one aspect of the present invention, there is provided a system comprising: a first user device and at least a second user device for a same user, at least one of the first and second user devices being a household media appliance, and each being installed with a respective instance of a communication client application for conducting voice or video calls over a packet-based network; wherein each of the instances of the communication client is associated with a same user identifier identifying said same user, a first of said instances of the client application is associated with a first sub-identifier, and a second of said instances is associated with a second sub-identifier; and the instances of the communication client are configured so as, during an ongoing call between the first user device and a remote user device conducted over a first network connection established based on said user identifier and the first sub-identifier, after the call has been answered, to establish a second network connection over the packet-based network based on said user identifier and the second sub-identifier and to switch the call to the second network connection.

The present invention thus allows a user to switch between devices so as to select the most convenient for the current situation, but without having to log out or re-dial, and whilst maintaining a consistent user identity within the communication system.

For example, suppose the user has an instance of a VoIP client application installed on a mobile terminal and another instance of the same VoIP client installed on a household television set, and is logged on to both. The user may be conducting a VoIP call on a mobile terminal, e.g. whilst travelling on his or her way back home, but when arriving back home would prefer to switch to a video call on the living room television set which would have better processing resources, bandwidth and screen.

In another example, the present invention may be useful if there are different devices located in different rooms around the house, e.g. with one instance of the communication client installed on a PC in a study or bedroom and another instance of the same client being embedded on a television in the living room. In such cases, a user may begin a call on the PC, but then later move to the living room to continue the call on the television set. E.g. the television may have been unavailable at the beginning of the call due to another householder watching a programme.

Conventional VoIP client applications only enable an endpoint of a call to be identified by means of one single username, which maps to a single network address for a single endpoint device of that user. Hence if a user was to log on to two different instances of the same client application on different devices but using the same username, establish a connection between a first of those instances and a remote user, and then attempted to establish a connection with the same remote user, the attempt would fail because the remote client would be unable to map two different network addresses to the same username. So in order to switch devices, the user would have to manually hang up, log on to a new instance of the client on the television set, and then set-up a completely new call. This would be a cumbersome process, and would also result in a discontinuity in the call.

Some known "call forwarding" features do exist, but these work by setting up a new call with an endpoint identified by a completely different user identifier, and so are only used to transfer a call from one user to another. Conventional call forwarding does not support a concept of two endpoints being devices of the same user represented by the same user identity for the purpose of continuing the same call with the same user. An example of call forwarding is disclosed in U.S. application Ser. No. 12/290,232, publication no. US 2009-0136016.

The present invention on the other hand enables such switching by providing a system of user IDs and separate sub-IDs, with each user ID being able to be associated with multiple sub-IDs mapping to different network endpoint addresses. Thus a single user has a unique user ID but may have multiple sub-IDs identifying different instances of the client application for that same user. In this system, it is the combination of user ID and sub-ID that identifies the network endpoint for the call, with each combination of user ID and sub-ID mapping to a different network address for a different endpoint device. At the same time however, the user ID alone without the sub-ID still uniquely identifies the user themselves, i.e. the actual person.

This means the two different instances can be distinguished from the perspective of network routing. Therefore the two instances can distinguish between one another in order to negotiate the switch, and furthermore the two instances can be separately identified to the client on the remote user's device in order to set-up a new connection. But nonetheless, from the perspective of the remote user the call still appears to originate from the same user identity.

In embodiments, the system may comprise storage apparatus mapping user identifiers to network addresses locating user devices within the packet-based network, wherein the storage apparatus may map a combination of said user identifier and the first sub-identifier to an address of the first user device, and map a combination of said user identifier an the second sub-identifier to an address of the second user device.

The system may comprise storage apparatus mapping said user identifier to same user profile details, representing said same user to a user of the remote user device during the call over both of said first and second network connections.

The second instance of the communication client may be configured to request the call from the instance on the first device, and the first instance may be configured to relinquish the call in response to said request.

The first instance of the communication client may be configured to offer the call to the second instance, and the second instance may be configured to accept the call in response to said offer.

One or more of said request, relinquishment, offer and acceptance by one of the instances of the communication client may be conditional on authenticating the identity of the other instance.

The instance of the client application on the first user device may be configured to share an address of the remote user terminal with the instance on the second user device when performing said switch.

The instances of the communication client may be configured so as to switch between a voice and a video call when switching between said first and second connections.

The other of said first and second user devices may be a mobile device. Alternatively both of said first and second user devices may be household media appliances. The household media appliance may be a television set or set-top box.

The storage apparatus may comprise one of: a server, and a distributed look-up table distributed amongst a plurality of further user devices.

According to another aspect of the present invention, there is provided a first user device installed with a first instance of a communication client application for conducting voice or video calls over a packet-based network, communicable with a second user device of a same user installed with a second instance of the communication client application, at least one of the first and second user devices being a household media appliance, wherein: the first user device is arranged to access a storage apparatus mapping user identifiers to network addresses locating user devices within the packet-based network, wherein each of the instances of the communication client is associated with a same user identifier identifying said same user, the storage apparatus mapping a combination of said user identifier and a first sub-identifier to an address of the first user device, and a combination of said user identifier an a second sub-identifier to an address of the second user device; and the first instance of the communication client is configured so as, during an ongoing call between the first user device and a remote user device conducted over a first network connection established based on said user identifier and the first sub-identifier, after the call has been answered, to negotiate with the second instance to switch the call to the second network connection established over the packet-based network based on said user identifier and the second sub-identifier.

According to another aspect of the present invention, there is provided a method of operating a first user device and at least a second user device for a same user, at least one of the first and second user devices being a household media appliance, and each being installed with a respective instance of a communication client application for conducting voice or video calls over a packet-based network; the method comprising: associating each of the instances of the communication client with a same user identifier identifying said same user; associating a first of said instances of the client application is associated with a first sub-identifier, and associating a second of said instances with a second sub-identifier; and during an ongoing call between the first user device and a remote user device conducted over a first network connection established based on said user identifier and the first sub-identifier, after the call has been answered, establishing a second network connection over the packet-based network based on said user identifier and the second sub-identifier and switching the call to the second network connection.

In embodiments there may be provided a method comprising steps in accordance with any of the described system features.

According to another aspect of the present invention, there is provided a program product embodied on a computer readable medium, comprising a first instance of a communication client application for conducting voice or video calls over a packet-based network when executed on a first user device, communicable with a second user device of a same user installed with a second instance of the communication client application, at least one of the first and second user devices being a household media appliance; wherein: the first instance of the communication client application is arranged to access a storage apparatus mapping user identifiers to network addresses locating user devices within the packet-based network, wherein each of the instances of the communication client is associated with a same user identifier identifying said same user, the storage apparatus mapping a combination of said user identifier and a first sub-identifier to an address of the first user device, and a combination of said user identifier an a second sub-identifier to an address of the second user device; and the first instance of the communication client is configured so as, during an ongoing call between the first user device and a remote user device conducted over a first network connection established based on said user identifier and the first sub-identifier, after the call has been answered, to negotiate with the second instance to switch the call to the second network connection established over the packet-based network based on said user identifier and the second sub-identifier.

In embodiments there may be provided a program product configured in accordance with any of the described system features.

BRIEF DESCRIPTION OF THE DRAWINGS

For a better understanding of the present invention and to show how it may be put into effect, reference is made by way of example to the accompanying drawings in which.

DETAILED DESCRIPTION OF PREFERRED EMBODIMENTS

Figure 1:
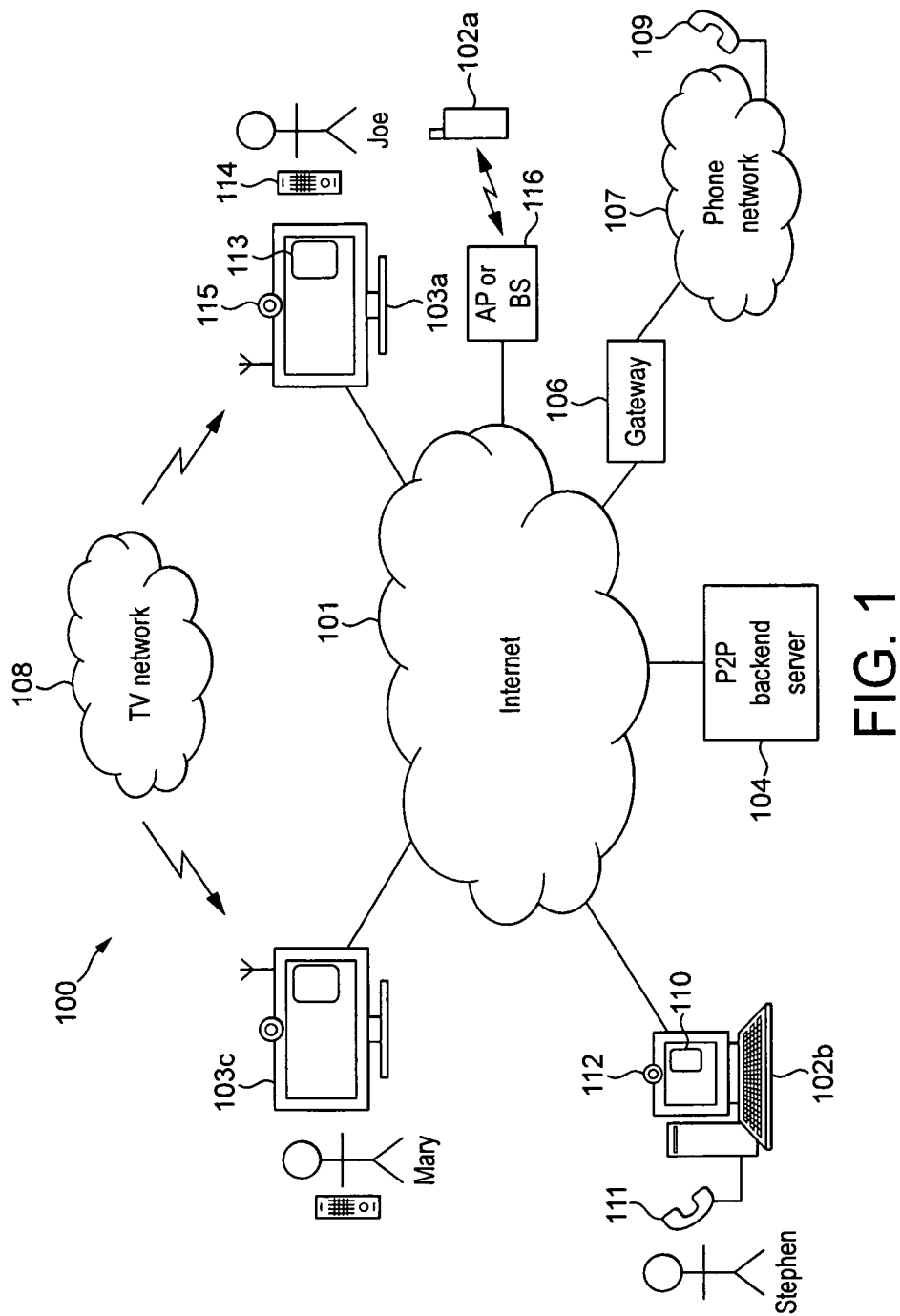
FIG. 1 is a schematic representation of a communication system.

FIG. 1 shows a communication system 100 comprising a packet-based network 101 such as the Internet; and further comprising a separate television broadcasting network 108 such as a terrestrial, satellite or cable television network. A plurality of computer terminals 102 are shown coupled to the Internet 101, each comprising a network interface for communicating over the Internet. A plurality of television sets 103 are also shown coupled to the Internet 101, each of which also comprises a network interface for communicating over the Internet. In addition to the network interface, each television set 103 further comprises a television receiver for receiving analogue and/or digital television signals which are broadcast over the television network 108. Alternatively or additionally, a television set 103 could be arranged to receive packet-based television signals over the Internet 101 or other such packet-based network. However, broadcast television is still popular at the time of writing and so in preferred embodiments the television set 103 will comprise a television receiver for receiving broadcasts at least.

The difference between a broadcast and a communication made over a packet-based network is that broadcast signals are transmitted indiscriminately, without transmitting to selected destination devices and regardless of whether the end-user has selected to receive the signal (although a decryption key or such like may still be required so that only authorised users can derive meaningful information from the television signal for viewing). Packet-based communications on the other hand are point-to-point, with an address of the intended destination device being included in the packets. In the case of packet-based television signals transmitted over the Internet, these are still point-to-multipoint communications rather than a broadcast.

Each computer terminal 102 is installed with a communication client application 110. Each computer terminal 102 also comprises an audio transceiver 111 comprising a speaker and microphone, e.g. in the form of a headset or handset, or a built-in speaker and microphone. Most computer terminals 102 preferably also comprise a webcam 112. Furthermore, each television set 103 comprises an embedded processor and memory installed with a version of the communication client application 113 specially adapted for running on a television set. Each television set 103 also comprises a webcam 115 and an audio transceiver with speaker and microphone, or is connected or communicable with such components. In a particularly preferred embodiment an audio transceiver is provided in a remote control unit 114 of the television 103, discussed shortly.

The communication client applications 110 and 113 are preferably peer-to-peer clients for setting-up and conducting VoIP calls according to peer-to-peer principles as discussed above. To that end, a peer-to-peer backend server 104 is coupled to the Internet 101 for receiving registration requests from the client applications 111 and 113. The back-end server 104 is arranged to distribute UIC certificates to the respective client applications 111 and 113 running on the computer terminals 102 and television sets 103 in response to the registration requests. Once registered and thus in possession of a UIC certificate, the client applications 111 and/or 113 can look-up one another's addresses, exchange and authenticate one another's certificates, and thus establish a voice or video call over the Internet 101. It will be appreciated however that other kinds of communication client could alternatively be used, e.g. based on centralized server-based call set-up.

In addition, the communication system 100 may comprise a telephone network 107 such as a circuit-switched network, and a gateway 106 connecting between the Internet 101 and the telephone network 107. A gateway version of the client application is arranged to run on the gateway 106, and a communication client application 110 or 113 running on a computer terminal 102 or television set 103 is thus able to establish a call with a dedicated phone unit 109 of the telephone network 107. This is achieved by establishing a connection with the client on the gateway 106 using peer-to-peer call set-up and then supplying the relevant telephone number to the gateway 107 (effectively the user's client 110 or 113 sees the gateway 106 as a peer). The phone network 107 may for example comprise a fixed-line network ("landline") and/or a mobile cellular network.

Figure 2:
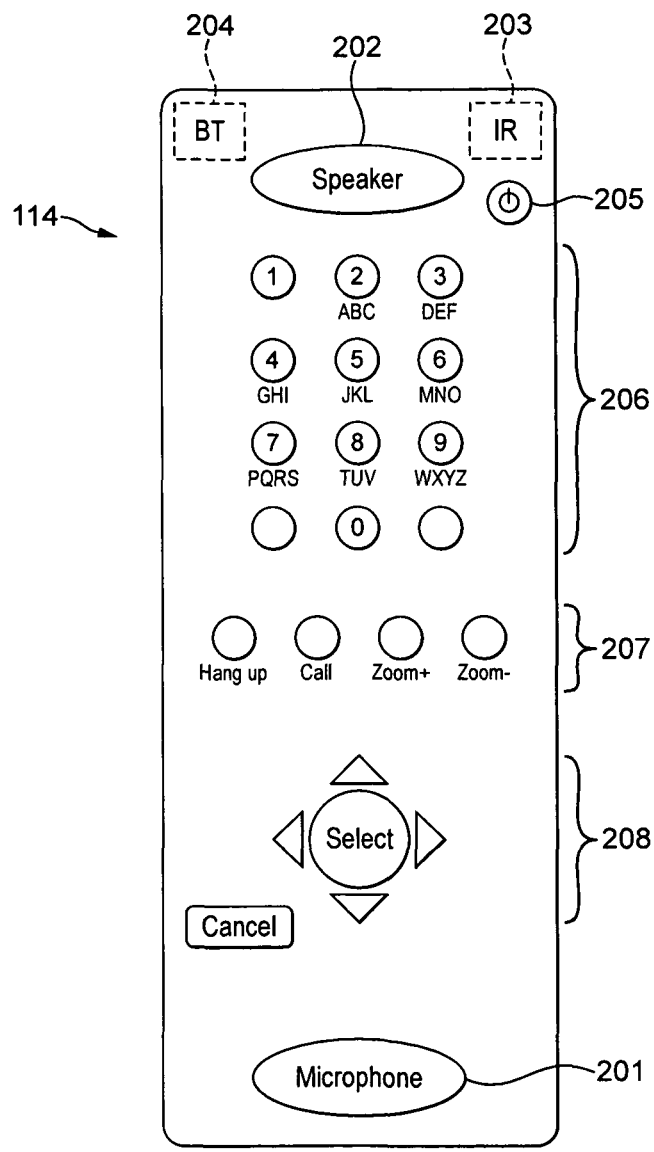
FIG. 2 is a schematic representation of a remote control unit.

Each television set 103 has an associated remote control unit 114, an example of which is illustrated in FIG. 2.

As shown in FIG. 2, the remote control unit (or just "remote control") comprises a microphone 201, speaker 202, a first remote interface in the form of an infrared (IR) transmitter 203, and a second remote interface in the form of a short-range RF interface 204 such as a Bluetooth interface. The microphone 201 and speaker 202 are operatively coupled to the Bluetooth interface 204. The remote control 114 is thus arranged to communicate voice signals from the microphone 201 to the television 103 via the Bluetooth interface 204, and to receive voice signals from the television 103 via the Bluetooth interface 204 for playing out of the speaker 202.

The remote control 114 further comprises a plurality of buttons operatively coupled to the infrared transmitter 203, arranged so as to allow the user to control the television 103 via the infrared transmitter 203. The buttons comprise a "standby" button 205 for setting the television into a low-power mode. The buttons further comprise numerical or alphanumeric buttons 206 for changing channel or supplying other numerical or alphanumerical data to the television 103; function buttons 208 for controlling various functions of the television 103, e.g. for controlling a cursor and/or menu system; and optionally dedicated calling buttons 207 for performing specific dedicated operations relating to the calling functionality of the client application 113, e.g. "call", "hang up", or buttons for zooming in and out during a video call.

Figure 3A:
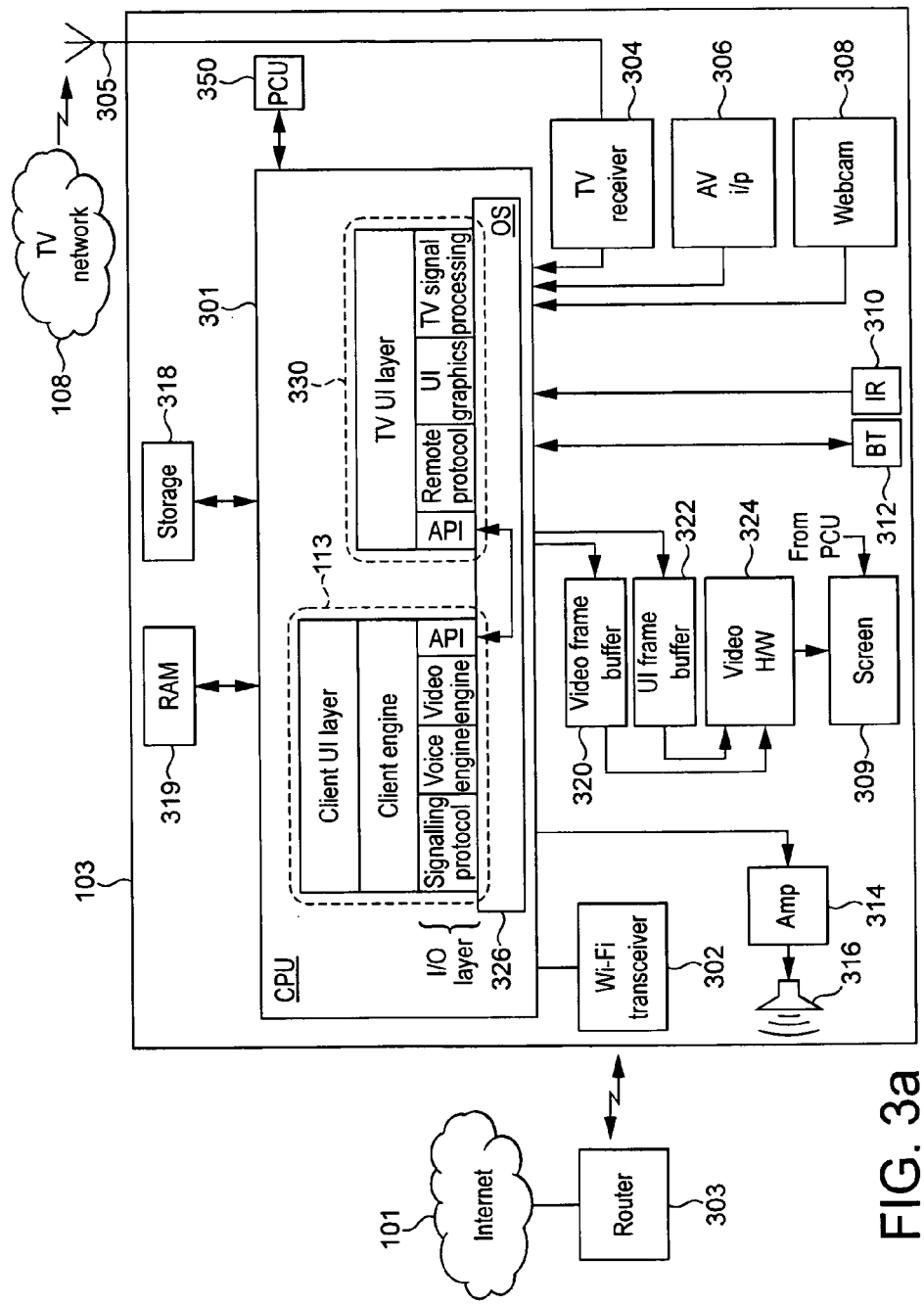
FIG. 3a is a schematic block diagram of a television set.

FIG. 3a is a schematic block diagram of a television set 103 according to an exemplary embodiment of the present invention. The television set 103 is a dedicated television unit in the sense that its primary purpose is as a television, and is designed to fulfill the role of a family or household television. However, at the same time it is additionally provided with secondary embedded functionality such as VoIP calling.

The televisions set 103 comprises, within a single casing: an embedded processing apparatus 301; a random access memory (RAM) 319; and an embedded non-volatile storage device 318 which may comprise an electronically erasable and reprogrammable memory (EEPROM or "flash" memory), a magnetic storage medium, and/or a one-time writable ROM. The non-volatile storage device 318 is coupled to the processing apparatus 301 and stores a basic operating system (OS) 326, a television application 330, and a communication client application 113 such as a VoIP client. The processing apparatus 301 is arranged to execute the operating system 326, e.g. either by fetching instructions directly from ROM or by first loading from a flash memory into the RAM 319 before fetching. When executed, the operating system 326 is configured to load the television application 330 and client application 113 into RAM 319 and schedule them for execution on the processing apparatus 301. The processing apparatus 301 is thus arranged to run the television application 330 and client application 113 under control of the operating system 326. In embodiments only a minimal operating system 326 may be required, in the form of a basic scheduler.

The television set 103 further comprises, within the same casing: a video frame buffer 320 and user interface (UI) frame buffer 322, video hardware 324, a screen 309, an amplifier 314 and speaker 316 or output to an external speaker or headphones, a television receiver 304, an external audio-video (AV) input 306 such as a SCART or HDMI input from an external source, a webcam or webcam input 308 for connecting to an external webcam, a network interface 302 in the form of a first short-range RF transceiver such as a wi-fi transceiver, a first remote interface 310 in the form of an infrared (IR) receiver, and a second remote interface in the form of a second short-range RF transceiver 312 such as a Bluetooth transceiver.

The video frame buffer 320 and user interface (UI) frame buffer 322 each have an input coupled to the processing apparatus 301. The video hardware 324 has an input coupled to the outputs of the video frame buffer 320 and UI frame buffer 322. The screen 309 has an input to the output of the video hardware 324. In embodiments, the frame buffers 320 and 322 could be dedicated hardware buffers or alternatively could be implemented in a general purpose memory. The amplifier 314 has an input coupled to the processing apparatus 301 and an output coupled to the speaker 316. The processing apparatus 301 is further coupled to the network interface 302, television receiver 304, auxiliary input 306, webcam input 308, infrared interface 310, and Bluetooth interface 312.

Any or all of the above components may be coupled to the processing apparatus 301 via intermediate components such as a bus and/or cache (not shown), as will be understood by a person skilled in the art.

The television receiver 304 comprises an input for connecting to at least one reception means such as an antenna, satellite dish or cable line, and is thus arranged to receive television broadcast signals from the television network 108 via the reception means. The television receiver 304 is a hardware front-end which may comprise for example: sampling circuitry, a low noise amplifier, a filter, a mixer, and/or an analogue-to-digital converter (ADC). Once received by the television receiver unit 304, the television signals are thus made available to the processing apparatus 301 for signal processing. The television application 330 comprises a signal processing engine in the form of code which, when executed, performs at least some of the required signal processing on the received television signals. The processed television signals are then output to the video frame buffer 320 and amplifier 314 for consumption by the end user. The signal processing engine may comprise for example: a digital filter, demodulator, demultiplexer, decoder, decryption block, and/or error checking block. However, different ways of allocating the television receiver and processing functionality between software and dedicated hardware are also possible. E.g. in embodiments, more of the functionality such as the demultiplexing could be moved to the receiver front-end 304. Techniques for receiving and processing television signals will be known to a person skilled in the art.

In the case of traditional analogue television broadcasts, the signals of a plurality of different concurrent programs (of different TV channels) are frequency-division multiplexed over the airwaves by being transmitted on different frequencies. The television receiver 304 will then comprise a tuning circuit to demultiplex the broadcasts and thereby separate out the signal of the required programme. In the case of digital television broadcasts, the signals of different concurrent programs are each divided into packets and interleaved so as to time-division multiplex the different programs' signals into a transport stream for broadcast. The signal processing engine of the television application 330 will then comprise a packet filter to demultiplex the packets of different transport streams and so separate out the signal of the required programme. Multiple transport streams may also be broadcast on different frequencies, requiring a tuner as well. Furthermore, for digital television, one or more of the transport streams may comprise additional programme information such as an electronic programme guide (EPG).

Video signals for output to the television screen 309 may also be received via the AV input 306 from an external source such as a DVD player or games console.

The television application 330 further comprises a UI graphics engine, a remote protocol engine, an application programming interface (API), and a television UI layer. The overall operation of the signal processing engine, UI graphics engine, remote protocol engine and API is controlled by the television UI layer. The user can select which broadcast to view by pressing buttons 205, 206, 208 on the remote control 114, causing the remote control 114 to communicate control signals to the processing apparatus 301 via the infrared transmitter 203 and receiver 310. The user may also use the buttons in a similar manner to view additional information such as the EPG or control menus, and to navigate the EPG or menus. The relevant control signals are interpreted by the remote protocol engine of the television application 113, which in turn communicates with the television UI layer. In response, the television UI layer controls the signal processing engine to output the relevant television programme to the video frame buffer 320, and/or controls the UI graphics engine to output graphics to the UI frame buffer 322 (e.g. to display the graphics of the menu or EPG). The frame buffers 320 and/or 322 supply their contents to the video hardware 324 for display on the screen 309. In embodiments the UI frame buffer 322 and video hardware 324 may be arranged to overlay UI graphics over the current television programme in a partially transparent manner, and/or to leave at least part of the television programme visible.

As mentioned, the television set 103 comprises a network interface 302. In preferred embodiments this takes the form of a wireless transceiver such as a wi-fi transceiver, for communicating wirelessly with a household or office-based wireless router 303 as found in most modern homes or offices. The router 303 in turn connects to the Internet 101. However, in alternative embodiments the network interface 302 may comprise other options such as a wired modem or a port to an external wired modem.

The communication client application 330 comprises a protocol stack having an I/O layer which, when executed on the processing unit 301, is operable to transmit and receive signals over the Internet 101 via the network interface 302. The I/O layer comprises a network signalling protocol for transmitting and receiving control signals over the Internet 101 via the network interface 302. The I/O layer may also comprise an API for communicating with the API of the television application 301.

The I/O layer further comprises a voice engine comprising a voice codec. The voice engine is arranged to accept speech signals from the microphone 201, and to encode those speech signals for transmission over the internet 101 via the network interface 302. The voice engine is also arranged to decode speech signals received over the Internet 101 via the network interface 302, for output to the television's amplifier 314 and speaker 316, or to the speaker 202 in the remote control 114 via the Bluetooth interfaces 312 and 204. The I/O layer further comprises a video engine comprising a video codec. The video engine is arranged to accept video signals from the webcam input 308, and to encode those video signals for transmission over the Internet 101 via the network interface 302. The video engine is also arranged to decode video signals received over the Internet 101 via the network interface 302, for output to the UI frame buffer 322, video hardware 326 and screen 309. Alternatively, in a full-screen mode the video codec could output video via the video frame buffer 320.

Higher up the protocol stack, the client application 113 comprises a client engine which is responsible for call-set up. The client engine controls the network signalling protocol engine of the client 113 in order to establish a live voice or video call with another user terminal 102 or 103 over the Internet 101, preferably using P2P call set-up as discussed above, or potentially using a centralized call set-up via a server. The client engine may also handle other functions such as connection management, authentication, encryption, and/or exchanging presence information with the client applications 111 or 113 of other user terminals (presence information indicates the availability of a user for communication, and is preferably at least partially defined by the respective user themselves).

Even higher up the protocol stack, the client application 113 comprises a client UI layer which is responsible for the client's user interface. The client UI layer is operable to generate a client user interface for output to the UI frame buffer 322, video hardware 324 and screen 309. This may be output via the APIs and the UI graphics engine of the TV application 330 under control of the TV UI layer (or alternatively the client application 113 could be provided with its own UI graphics protocol to output graphics to the UI frame buffer 322 directly). The client user interface thus presents the user with on-screen controls which they can activate using buttons 206, 207, 208 on the remote control 114. Based on these button presses, the remote control 114 communicates control signals to the processing apparatus 301 via the infrared transmitter 203 and receiver 310. These control signals may be interpreted by the UI protocol engine in the television application 330 and then signalled via the APIs to the I/O layer of the client application 113 (or alternatively the I/O layer of the client application 113 could be provided with its own remote control protocol to interpret these control signals directly). In turn, the protocol of the I/O layer of the client 113 communicates with the client UI layer. The client UI layer is thus configured to respond to user inputs in order to control the overall operation of the client application 113, e.g. allowing a user to select contacts to call, hand up, etc.

Figure 4:
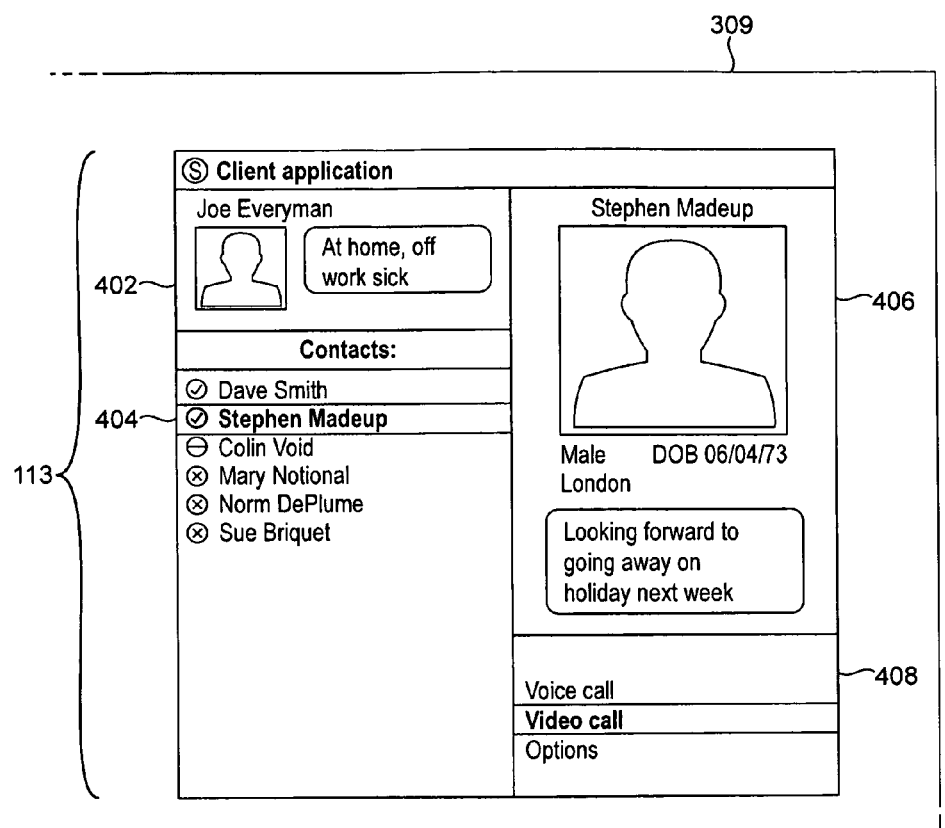
FIG. 4 is a schematic representation of a user interface.

FIG. 4 illustrates an example user interface which could be displayed on the screen 309 by the client application 113, when summoned by the user using the relevant buttons of the remote 114. The user interface may be displayed only on part of the screen 309, allowing at least a portion of a currently viewed programme to remain visible; or may alternatively take up the whole screen 309. The displayed user interface comprises a number of panels. For example, the user interface may comprise a first panel 402 showing profile information of the user of the television 103 on which the client 113 is running. E.g. the profile information may comprise the user's name, an "avatar image" (a picture which the user has chosen to represent themselves), and/or a "mood message" (a short user-defined statement for inclusion in their profile). Further, the user interface may comprise a second panel 404 showing a list of the user's contacts (preferably the client 113 is configured to only allow calls between users who have agreed to be contacts). Further, the user interface may comprise a third panel 406 showing a profile of a selected one of the contacts, and/or a fourth panel 408 providing a menu or other controls for selecting to call the selected contact.

Furthermore, the UI layer of the client 113 may be configured to communicate with the UI layer of the television application 330, via the APIs and the operating system 326. This allows the client application 113 and television application 330 to negotiate control of the screen 309 and/or speaker 316 or 202.

Whether the client application 113 or television application 330 takes precedence may depend on the implementation and/or situation. Since the television set 103 is primarily a television, then preferably the client application 113 should require permission from the television application 330 before controlling the screen 309 or speaker 316 or 202. However, in embodiments a user-defined setting may be provided allowing the user to control whether or not the client application 113 can autonomously take control of the screen 309 and/or speaker 316 or 202, e.g. to notify the user in event of an incoming call. This setting would preferably be stored in a non-volatile memory 318 and be readable by the client application 113 and/or television application 330. E.g. the television application 330 may be configured to read a setting from memory and, if set, to unequivocally allow the client application 113 to control the screen and/or speaker. Alternatively the client application 113 may be configured to read a setting from memory and, if set, to control the screen and/or speaker without seeking permission from the television application 330.

As discussed, FIG. 3a illustrates a user device 103b installed with one instance of the communication client application 113 for a user such as Joe.

Figure 3B:
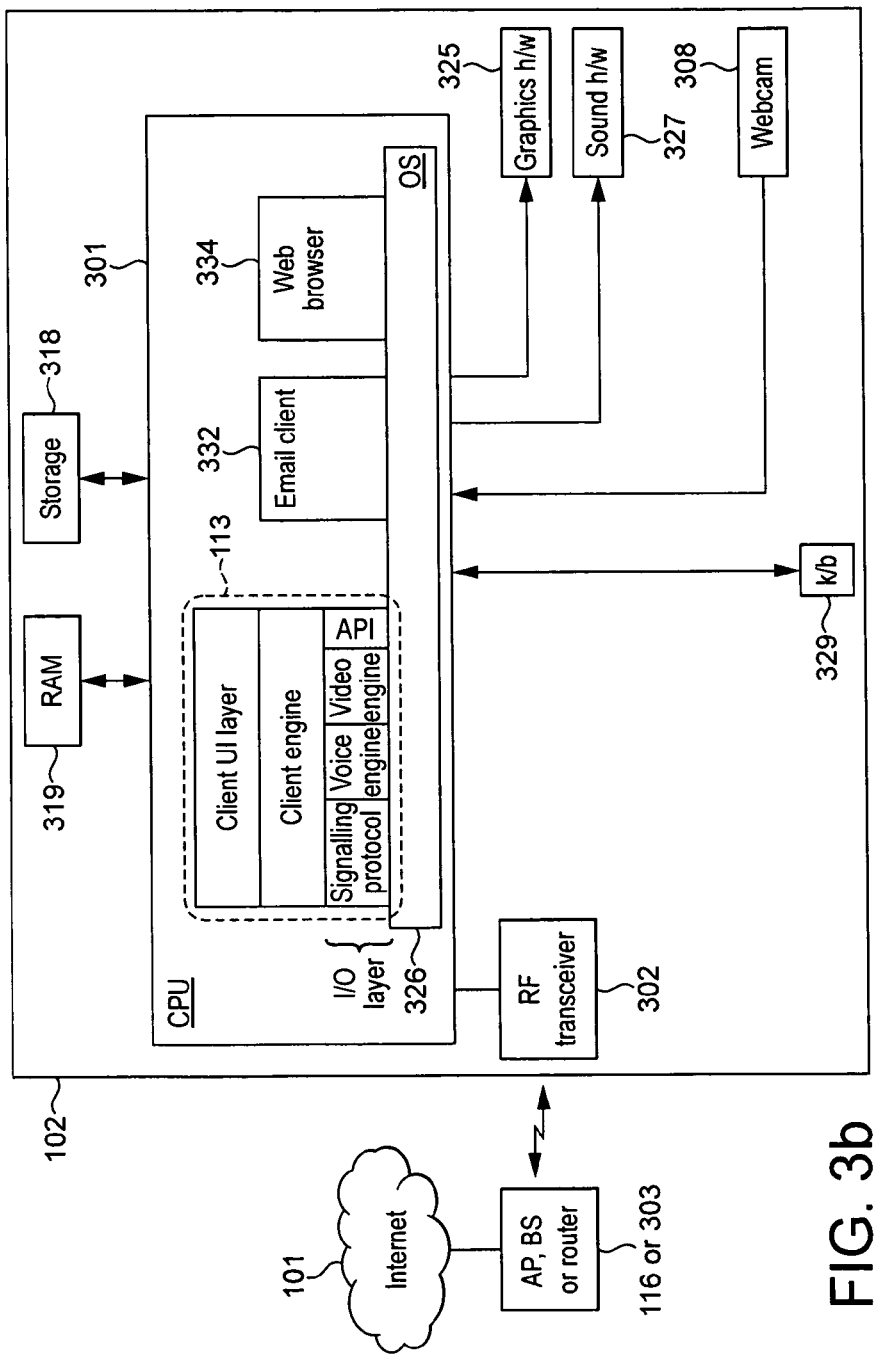
FIG. 3b is a schematic block diagram of a personal computer.

FIG. 3b shows schematically a second user device in the form of a mobile phone or laptop or desktop PC 102a installed with another instance of the same communication client application 113 for the same user, e.g. Joe again. Similarly to the television 103a, the computer or mobile 102a comprises a processing apparatus 301 in the form of one or more CPUs, coupled to: a non-volatile storage means 318 such as a hard drive, flash memory and/or optical disc drive for storing the second instance of the communication client for execution on the processing apparatus 301; a RAM 319; a webcam or input 308 from a webcam; video hardware 325 for outputting graphics to an external or inbuilt screen; audio hardware 327 for outputting audio signals to an external or inbuilt speaker or headphones; a user input means such as a keyboard 329 or touch screen; and a network interface 302 allowing the second instance of the communication client to access the Internet or other packet-based network 101. This network interface 302 may comprise a wi-fi transceiver for accessing the Internet via a wireless router 303 in the home, or via a wireless access point (AP) 116 of a wi-fi hotspot (see FIG. 1). Alternatively or additionally, the network interface 302 may comprise another RF transceiver for accessing the Internet 101 via a cellular base station BS (node B in 3GPP terminology) and GPRS or HSPA service for example.

Accessible via the Internet 101 is a storage apparatus storing an address look-up table, which maps user identities to network addresses of the various user devices 102 and 103 connected to the Internet 101. In a P2P communication system the storage apparatus comprises a distributed look-up table distributed amongst a plurality of other user devices 102 and/or 103. In other systems however, the storage apparatus may comprise a server 104. In order to set-up a network connection for conducting a call, the client 113 on a calling device looks up the address of the callee device on the storage apparatus, and uses that address to send a call set-up request to the callee and thereby establish the connection.

According to the present invention, a user can switch between devices mid-call. By way of example, the following will be described in terms of a first instance of the VoIP client application 113 installed and running on a first device in the form of a mobile or laptop device 102a, and a second instance of the same VoIP client application 113 installed and running on a second device in the form of a television set 103 or set-top box. Both devices belong to the same user, e.g. Joe, and that same user is logged on to both the first and second instances of the client 113 using the same user identifier (e.g. same username). During a call with another, remote user, i.e. after the call has been answered and is still ongoing, the present invention enables the local user to switch between the first and second devices for conducting the ongoing call.

In conventional systems, it is not possible for one instance of a client application to contact another instance of the same client application when the same user is logged onto both with the same username, because the username maps only to a single address and so there is no way to distinguish the two instances as two different network endpoints. Also the host of a call cannot hang up. So for example, if a caller tried to call the same callee from two different instances of the caller's client, this would fail. Hence it would not be possible for the two instances to negotiate a switch, nor for the remote user's device on the other end of the call to tell them apart.

The following system provides a solution by, for each user ID identifying a particular user, allowing multiple sub-IDs to be associated with it in the address look-up table. Thus two different instances of the same client on two different devices can be distinguished for the purpose of switching devices mid-call.

Suppose the call begins with the first device 102a. If the user of the two devices (the "local" user) initiates a call with a remote user having only one device 102b, the first instance of the client on the first device 103a looks up the address of the required remote user device based on the user ID (e.g. username) of the remote user, and transmits a call request message which the remote user may accept or decline. If it is the remote user who initiates the call on the other hand, the remote device 102b looks up the address mapped to one of the sub-IDs (in the case the first sub-ID of the first instance on the first device), and transmits a call request message which the local user may accept or decline. To allow a remote user to initiate a call, the look-up table may indicate one of the sub-IDs as the default, current or preferred instance.

Assuming the call is accepted, the first user device 102a and remote user device 102b establish a connection over the Internet 101 based on their network addresses, and use that connection to conduct the call.

At some subsequent point in the call, suppose then that the local user wishes to continue the same call on the second device 103a, e.g. having just arrived home and wanting to switch from a call on the mobile 102a to a more convenient or better quality call on the television set 103a. In particularly preferred embodiments for example, the user may switch from a voice call to a video call, the television set 103a having more adequate processing resources, bandwidth and/or screen resources than the mobile device 102a for the purpose of video calling.

In order to achieve the switching, the second device must negotiate with the first device, and the remote device must obtain the address of the second device.

In one embodiment, the local user instigates the switch from the second device 103a, e.g. by function buttons 208 on the remote 114. In that case, the client on the second device 103a may look up the address of the first device 102a based on the local user's ID and the sub-ID of the first instance, and uses that address to send a switching request to the first instance. The first instance then relinquishes control of the call in response to the request message, responding with a suitable response message to the second instance. To establish the connection between the second device and remote device there are a number of options. E.g. the second instance on the second device 103a could look up the address of the remote device 102b, or the address of the remote device could be shared in the response message from the first instance, or the first instance could supply the address or new sub-ID of the second instance to the remote device for the remote device to initiate the new connection.

Preferably the relinquishment of the call by the first instance is conditional on the first instance authenticating the second instance, e.g. by verifying a user identity certificate supplied from the second instance. The request itself may also be conditional on the second instance authenticating the first instance.

In an alternative embodiment, the local user instigates the switch from the first device 102a. In that case, the first instance of the client on the first device 102a may look-up the address of the second device 103a based on the local user's ID and the second sub-ID, and uses that address to send a switching offer message to the second instance. The second instance then accepts control of the call in response to the offer, responding with a suitable response message to the first instance. Again there are a number of options for establishing the connection between the second device and remote device, e.g. as discussed above.

Preferably the offer of the call from the first instance is conditional on the first instance authenticating the second instance, e.g. by verifying a user identity certificate supplied from the second instance. The acceptance may also be conditional on the second instance authenticating the first instance.

The second instance will preferably also exchange user identity certificates with the remote user in order to establish the new connection.

Note that in order to keep a channel open at all times throughout the switch, and avoid discontinuity in the call, the new connection between the second instance and remote user should preferably be created before terminating the original connection between the first instance and remote user.

Figure 5:
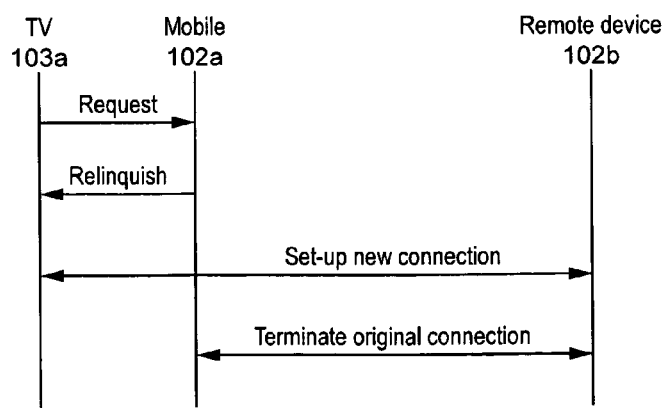
FIG. 5 is a signalling chart of a call switch between two devices.

FIG. 5 is a schematic signalling chart showing the negotiation, connection set-up and termination in one exemplary embodiment of the present invention.

Once the correct endpoint has been identified using the system of user ID and separate sub IDs described, and any required authentication has been performed, then the switching may be completed in a similar manner to known call forwarding techniques as described for example in U.S. application Ser. No. 12/290232, publication no. US 2009-0136016, but with the call being transferred between different devices of the same user based on different sub-IDs instead of the call being transferred between different users based on different user IDs.

Note also that, due to the same user ID being user for both connections, the local user maintains a constant user identity from the perspective of the remote user. For example, in one particularly preferred embodiment, user profile details are stored on storage apparatus such as a server 104 accessible to the remote user device 102b over the Internet 101 (or alternatively the profile details could be stored on a distributed database in a P2P fashion). This server 104 maps user profile details, such as the kind shown in FIG. 4, to user IDs (e.g. usernames). When the remote user device 102b conducts a call with the local user, it retrieves the local user's profile information from the server 104 based on the local user's ID (which it obtained from the local user's initial device during the set-up). When the call subsequently switches from a first connection with the first device 102a to a second connection with the second device 103a, both connections and both respective instances of the client application are still associated with the same user ID for the local user. Hence the remote user device 102b still sees the same profile information regardless of the connection, and so the call appears consistent from the perspective of the remote user.

In another particular embodiment, the television set 103a comprises a power control unit 350 coupled to the processing apparatus 301 and television screen 309, for switching between two or more power modes of the television set 103. As well as fully on, the power modes preferably include at least a "standby" type mode in which the screen 309 is turned off but the processing apparatus 301 and network interface 302 are maintained at least at a certain level of operation enabling the client application 113 to continue running and thereby monitor the network interface 302 for incoming signals received over the internet 101. In this case, the client application 113 may be configured so as, if receiving a call switching offer from the first device 102a, to issue a power control command to the PCU 350 controlling it to return the television 103 to a higher power mode in which the screen is turned on.

It will be appreciated that the above embodiments have been described only by way of example.

For instance, the switch could be between any two devices, from the first to the second device or vice versa, and these could be any combination of devices such as a mobile device and television, desktop PC and television, mobile device and desktop PC etc. Further, switching between three or more device during a call is also possible, based on three or more sub-IDs for the user.

Note also that the term "programme" does not limit to any particular kind of programme content, and could refer for example to a film, soap opera, documentary, sporting event, news program, etc.

Further, other ways of allocating the various client, television and other functionality amongst different processors are envisaged. For example, one or more dedicated signal processors (DSPs) could be arranged to execute the television signal processing engine of the television application 330 and/or the video engine and/or voice engine of the client application 113; with one or more separate CPUs being arranged to execute the UI layer, client engine, protocol and graphics engines of the client application 113 and/or the UI layer and protocol and graphics engines of the television application 330. In another example, the client application and television application would each be run on a different respective CPU embedded in the television set 103. Some or all of the functionality of the television application 330 could alternatively be implemented in dedicated hardware, including the possibility of hardwired signal processing apparatus in the television receiver front-end 304.

Further, where a server 104 is referred to above, this does not necessarily limit to a single server unit, and generally the server 104 can be implemented in one or more server units at one or more server locations.

Furthermore, although the preferred application, the invention is not limited to use in a television set having the above components including television screen all within one single self-contained casing. In another application, the invention could be implemented in a set-top box for plugging into such a television set. In that case the diagram would be similar to that of FIG. 3a but with the television hardware 320, 322, 324 and screen 309 replaced by an audio-video (AV) output.

Generally speaking the present invention can be applied to any media appliance having video apparatus for outputting signals to a television screen. The video apparatus may comprise any combination of dedicated hardware and/or regions of memory storing software modules, with any software modules being executed on either the same or a different processor unit as the client application 103. Depending on the appliance and the implementation, the video apparatus may take different forms. In the example television set of FIG. 3a for example, the video apparatus may be said to comprise a combination of the frame buffers 320 and 322, video hardware 324, and/or a region of the non-volatile memory 318 storing signal processing code of the television application. In the example computer terminal 102 of FIG. 3b, the video apparatus may be said to comprise the video hardware 325, and/or a region of the non-volatile storage 318 storing code for displaying graphics.

Further, the present invention need not be limited by television broadcasts. With increasing popularity of packet-based television services, there may be interest in the idea of a dedicated television set with the capability of receiving packet-based television signals, either over the Internet or a dedicated packet-based service.

Furthermore, note that the present invention is not limited particularly to VoIP or to a peer-to-peer topology. Other packet-based networks, protocols and methods of call set-up may also be used.

Other variations of the present invention may be apparent to a person skilled in the art given the disclosure herein. The scope of the present invention is not limited by the described embodiments, but only by the appendant claims.

The invention claimed is:

1. A system comprising:
   a first user device configured to communicate with a second user device, the first and second user devices being installed with a respective instance of a communication client application for conducting voice or video calls over a packet-based network;
   wherein each of the instances of the communication client application is associated with a same user identifier, a first of said instances of the communication client application is associated with a first sub-identifier, and a second of said instances is associated with a second sub-identifier; and
   the instance of the communication client application on the first device is configured to:
      during an ongoing call between the first user device and a remote user device conducted over a first network connection established based on said user identifier and the first sub-identifier, establish a second network connection over the packet-based network by sharing said user identifier and the second sub-identifier with the remote user device; and
      switch the call to the second network connection based on information mapping the first user device and the second user device to sub identifiers contained in a look-up table accessible to the first user device and the second user device such that the call, after being switched, continues via the second user device.

2. The system of claim 1, wherein the information in the lookup table includes a mapping of a combination of said user identifier and the first sub-identifier to an address of the first user device, and a mapping of a combination of said user identifier and the second sub-identifier to an address of the second user device.

3. The system of claim 1, further comprising a storage apparatus configured to map said user identifier to same user profile details, the storage apparatus accessible by the remote user device during the call over both of said first and second network connections.

4. The system of claim 1, wherein the second instance of the communication client application of the second device is configured to request the call from the instance on the first device, and first instance is configured to relinquish the call in response to said request.

5. The system of claim 1, wherein the first instance of the communication client application of the first device is configured to offer the call to the second instance, and the second instance is configured to accept the call in response to said offer.

6. The system of claim 4, wherein to request the call and to relinquish the call by one of the instances of the communication client application is conditional on authenticating the identity of the other instance.

7. The system of claim 1, wherein the instance of the communication client application on the first user device is configured to share an address of the remote user terminal with the instance on the second user device when performing said switch.

8. The system of claim 1, wherein the instances of the communication client application are configured to switch between a voice and a video call when switching between said first and second connections.

9. The system of claim 1, wherein at least one of the first and second user devices includes a household media appliance and the other of said first and second user devices is a mobile device.

10. The system of claim 1, wherein both of said first and second user devices are household media appliances.

11. The system of claim 10, wherein at least one of the household media appliances is a television set or set-top box.

12. The system of claim 1, wherein the a look-up table is accessible to the first user and the second user device from a server.

13. A first user device installed with a first instance of a communication client application for conducting voice or video calls over a packet-based network, communicable with a second user device installed with a second instance of the communication client application, the first user device being configured to:
   access a storage apparatus that maps user identifiers to network addresses locating user devices within the packet-based network, wherein each of the instances of the communication client application enable login at a same time using a same user identifier, the storage apparatus mapping a combination of said user identifier and a first sub-identifier to an address of the first user device, and a combination of said user identifier and a second sub-identifier to an address of the second user device; and
   during an answered call between the first user device and a remote user device conducted over a first network connection of the packet-based network established based on said user identifier and the first sub-identifier, negotiate, via the first instance of the communication client application, with the second instance of the communication client application to switch the call to a second network connection established over the packet-based network based on said user identifier and the second sub-identifier, the first and second network connections used to switch the call over the packet-based network between the first and second instances of the communication client application that each enable login using the same user identifier.

14. A method of operating a first user device and a second user device, the method comprising:

installing the first user device and the second user device with a respective instance of a same Voice over Internet Protocol (VoIP) client application for conducting voice or video calls over a packet-based network using a same user identifier;

enabling each of the instances of the same VoIP client application to login with the same user identifier;

associating a first of said instances of the same VoIP client application with a first sub-identifier, and associating a second of said instances of the same VoIP client application with a second sub-identifier;

during an ongoing call between the first user device and a remote user device conducted over a first network connection established over the packet-based network based on said user identifier and the first sub-identifier, establishing a second network connection over the packet-based network between the second user device and the remote user device based on said user identifier and the second sub-identifier; and with each of the instances of the same VoIP client application logged in using the same user identifier, switching the call to the second network connection based, at least in part, on a look-up table that includes data associating the first and second instances of the same VoIP client application and their respective sub-identifiers, the look-up table being available for use by each of the instances of the same VoIP client application and the remote user device.

15. A program product embodied on a computer readable memory, comprising a first instance of a communication client application for conducting voice or video calls over a packet-based network when executed on a first user device, communicable with a second user device installed with a second instance of the communication client application, the first instance of the communication client application being configured to:

access a storage apparatus that maps user identifiers to network addresses locating user devices within the packet-based network, wherein each of the instances of the communication client application is associated with a same user identifier, the storage apparatus mapping a combination of said user identifier and a first sub-identifier to an address of the first user device, and a combination of said user identifier and a second sub-identifier to an address of the second user device;

during an ongoing call between the first user device and a remote user device conducted over a first Voice over Internet Protocol (VoIP) network connection established based on said user identifier and the first sub-identifier, negotiate with the second instance of the communication client application and the remote user device to switch the call to a second VoIP network connection established over the packet-based network; and switch the call to the second VoIP network connection established over the packet-based network based, at least in part, on the negotiation between the first instance of the communication client application, the second instance of the communication client application, and the remote user device.

16. The system of claim 3, the storage apparatus further configured to provide the user profile details to the remote device, 17. The system of claim 1, wherein the first instance of the communication client application installed on the first device and the second instance of the communication client application installed the second device are configured to store respective digital certificates usable for exchange between the communication client application installed on the first device and the communication client application installed the second device.

18. The method of claim 14, further comprising causing the first user device to send an identifier of the remote user device to the second user device to enable switching of the VoIP call.

19. The method of claim 14, further comprising causing the first user device to supply an address of the second user device to the remote user device thereby enabling the VoIP call with the remote user device to switch from the first user device to the second user device.

20. The method of claim 14, further comprising causing the second user device to receive an address of the remote user device from the remote user device.

* * * * *